UNITED STATES PATENT OFFICE.

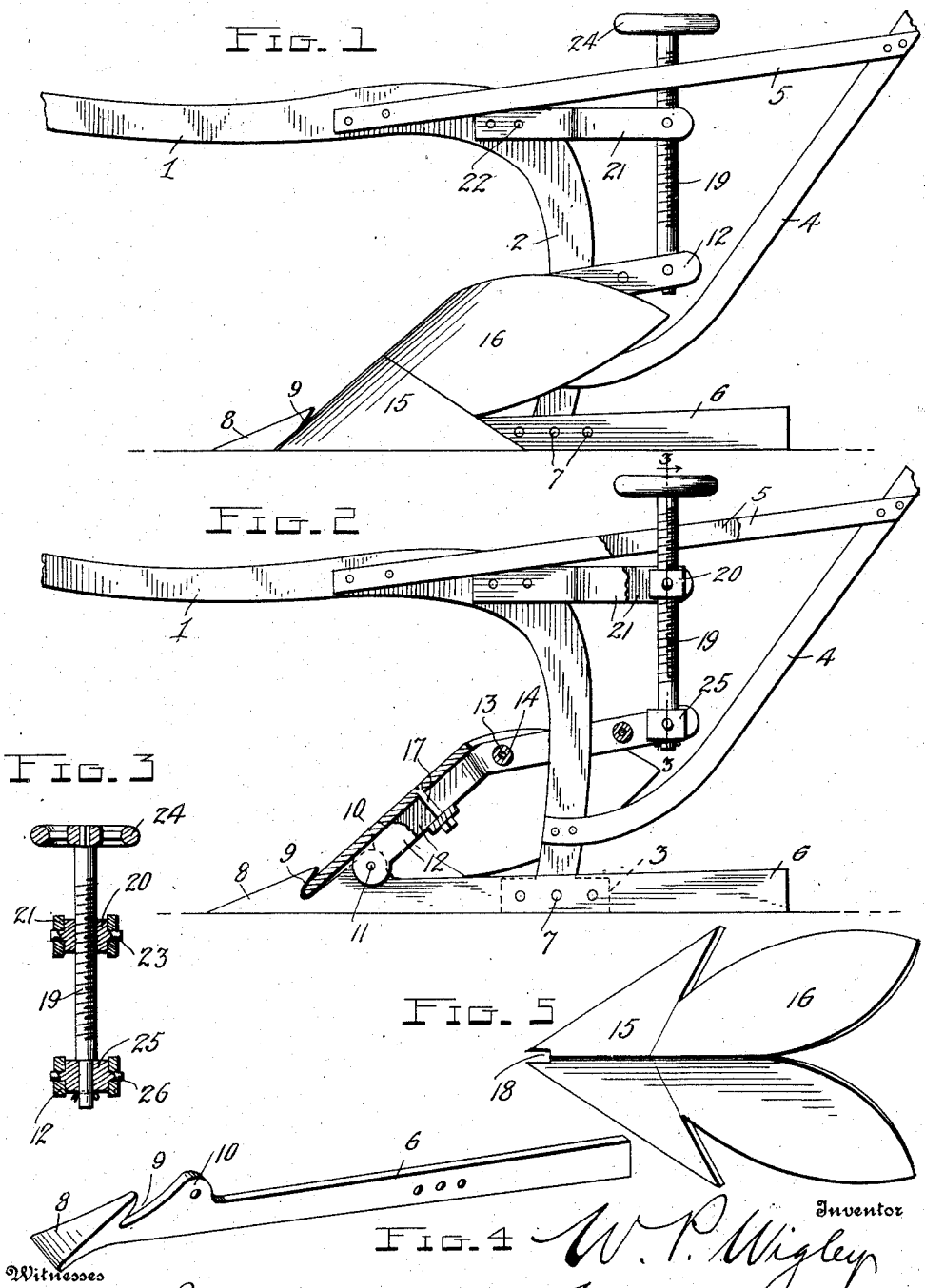

WILLIAM P. WIGLEY, OF LOTT, TEXAS.

PLOW.

No. 907,302.   Specification of Letters Patent.   Patented Dec. 22, 1908.

Application filed May 19, 1908. Serial No. 433,749.

*To all whom it may concern:*

Be it known that I, WILLIAM P. WIGLEY, a citizen of the United States, residing at Lott, in the county of Falls and State of Texas, have invented certain new and useful Improvements in Plows, of which the following is a specification, reference being had to the accompanying drawings.

My invention relates to improvements in plows, cultivators and similar agricultural implements and consists of the novel features of construction and the combination and arrangement of parts hereinafter fully described and claimed.

The object of the invention is to provide a simple and practical means for adjusting a plow share, cultivator shovel or the like angularly in a vertical plane.

The above and other objects of the invention are attained in its preferred embodiment illustrated in the accompanying drawings, in which—

Figure 1 is a side elevation of my improved plow; Fig. 2 is a detail vertical longitudinal section; Fig. 3 is a detail vertical transverse section taken on the plane indicated by the line 3—3 in Fig. 2; Fig. 4 is a detail view of the runner; and Fig. 5 is a detail view of the plow share.

In the drawings 1 denotes the beam of a plow, cultivator, or similar machine and 2 a standard depending therefrom and provided at its lower end with a longitudinally extending cross piece 3. Suitably connected handles 4 extend upwardly and rearwardly from the lower portion of the standard and are connected by braces 5 to the upper portion of the beam.

6 denotes a longitudinally extending runner which is preferably set in and rigidly bolted to the lower end or portion 3 of the standard 2, as shown at 7. The forward extremity of the runner 6 is enlarged and beveled to provide a point 8 and in its upper edge, suitably distant from said point, is a V-shaped notch or seat 9 which is inclined rearwardly. Upon the upper edge of the runner 6 between the seat 9 and the standard 2 is an upwardly projecting ear or lug 10 apertured to receive the pivot bolt 11 of a pair of supporting and adjusting bars 12 for a plow share, cultivator shovel or the like. The supporting and adjusting bars 12 have their forward downwardly inclined ends arranged on opposite sides of the runner 6 and their rear portions are offset to receive the standard 2 and are connected together and spaced apart by transverse bolts or similar fastenings 13 on which are arranged spacing sleeves 14. The bars 12 are thus rigidly connected and mounted for vertical swinging movement upon the pivot 11.

The swinging member formed by the bars 12 may carry a plow share or similar device of any form and construction, but as illustrated, carries one consisting of a V-shaped point 15 and a double mold board 16. These parts are rigidly connected to the bars 12 by a bolt 17 which extends between the bars 12 and they may be prevented from shifting laterally by forming the front end of the V-shaped point 15 with a notch 18 to enter the seat or undercut portion 9 in the forward portion or point 8 of the runner 6. Said seat 9, it will be noted, is so shaped as to provide a bearing for the forward extremity of the plow when the latter is adjusted angularly by raising and lowering the rear end of the swinging member or bars 12 and that said seat 9 is disposed immediately in rear of the point 8 on said bar 6 so that said point 8 forms the forward extremity of the point of the plow proper. For the purpose of raising and lowering the swinging member or bars 12 to incline the plow to a greater or less degree, I preferably employ a vertical screw 19 arranged in a nut 20 which is swiveled or pivoted between the rear ends of two bracket bars 21 that are bolted or otherwise secured, as at 22, to the beam 1. The nut 20 is in the form of a rectangular block having a threaded central opening to receive the screw and oppositely projecting pivot studs or trunions 23 which are mounted in bearing openings formed in the bars or arms 21. Upon the projecting upper end of the screw 19 is a suitable hand wheel 24 and its depending lower end is swiveled or rotatably mounted in a swiveled or pivoted block 25 arranged between the rear ends of the bars 12. This block 25 has a central opening to receive the reduced end of the screw and at opposite points it is provided with pivot studs 26 which are arranged in bearing openings in the bars 12.

In operation, it will be seen that by rotating the hand wheel 24 the screw may be caused to move upwardly or downwardly in the nut 20 and thereby raise or lower the rear end of the swinging member or bars 12 so as vary the downward and forward inclination of the plow share or other earth working element which is carried thereby.

Owing to the peculiar construction of the parts, it will be seen that the plow may be conveniently adjusted by its driver without stopping the animal or animals hitched to it.

While I have shown and described my invention as especially adapted for use on a plow, it will be understood that it may be used upon cultivators and similar agricultural implements and that when it is used upon a plow, a plow proper or plow share of any form and construction may be substituted for the one illustrated.

It will be further understood that various changes in the form, proportion and minor details of construction may be resorted to without departing from the spirit or sacrificing any of the advantages of the invention.

Having thus described my invention what I claim is:

1. An implement of the character described comprising a frame having a standard, a runner fixed to said standard and having a point and a seat adjacent to the latter, a swinging member pivoted to the runner in rear of said seat, a plow share carried by said swinging member and engaged with the seat in the runner, a swiveled block carried by said member, a screw swiveled in said block and a swiveled nut for said screw carried by said frame.

2. An implement of the character described comprising a beam, a standard depending therefrom, a runner carried by the standard, a swinging member pivoted to the forward portion of the runner and having spaced bars to receive the standard, a block swiveled between the spaced bars of said member, bracket arms carried by said beam, a nut swiveled in said bracket arms, an adjusting screw arranged in said nut and swiveled in said block and a plow share carried by said swinging member.

3. An implement of the character described comprising a beam, a standard, a runner rigidly secured to the lower end of the standard and formed at its forward end with a point and with a seat adjacent to said point, a swinging member composed of spaced bars arranged on opposite sides of the runner and pivoted to the same in rear of its seat, said bars being adapted to receive the standard between them, a plow share secured to the bars of said swinging member and having a notched portion to engage the seat in the runner, a block swiveled between the rear ends of the bars of the swinging member, bracket arms carried by said beam, a nut swiveled between said bracket arms, a screw in said nut and swiveled in said block and a hand wheel upon the upper end of said screw, substantially as described.

In testimony whereof I hereunto affix my signature in the presence of two witnesses.

WILLIAM P. WIGLEY.

Witnesses:
   Geo. A. Hodges,
   Jos. W. Earls.